Aug. 6, 1929.  S. B. STINE  1,723,311
METHOD OF MAKING SCREEN PLATES
Filed April 19, 1928  2 Sheets-Sheet 1
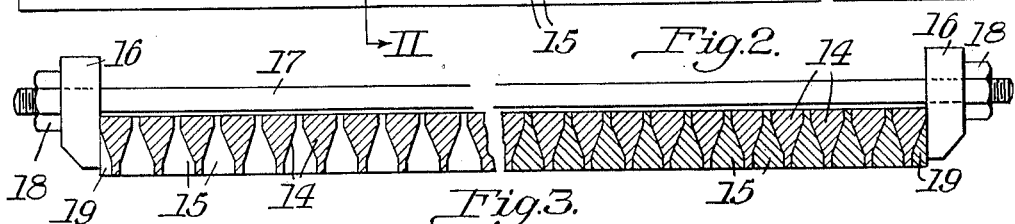
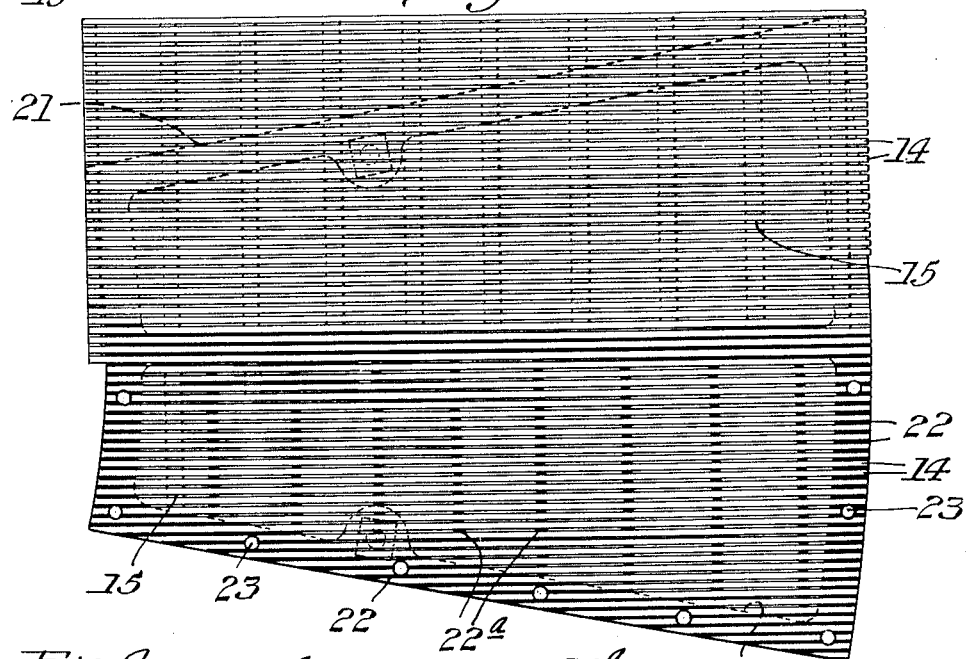
INVENTOR
Samuel Blaine Stine,
By Archworth Martin,
Attorney Aug. 6, 1929.   S. B. STINE   1,723,311
METHOD OF MAKING SCREEN PLATES
Filed April 19, 1928    2 Sheets-Sheet 2
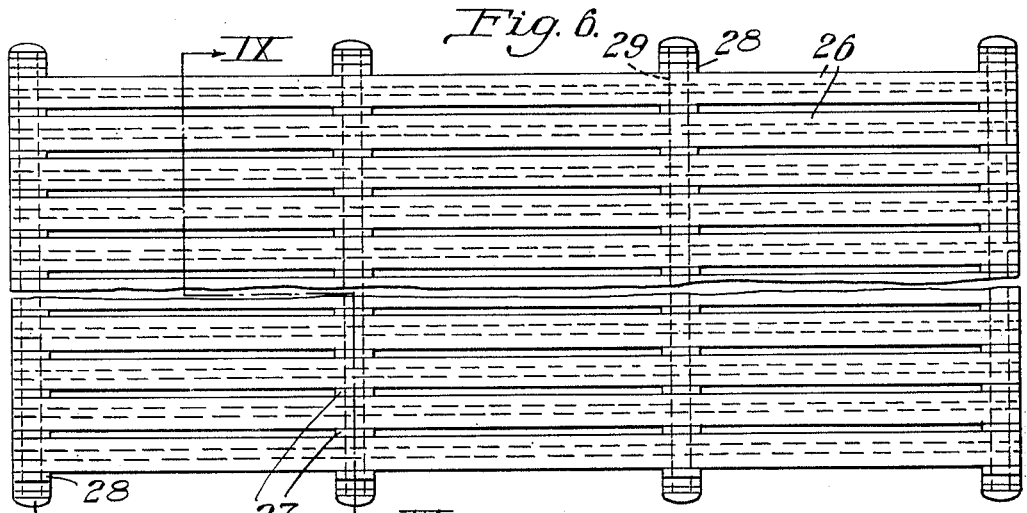
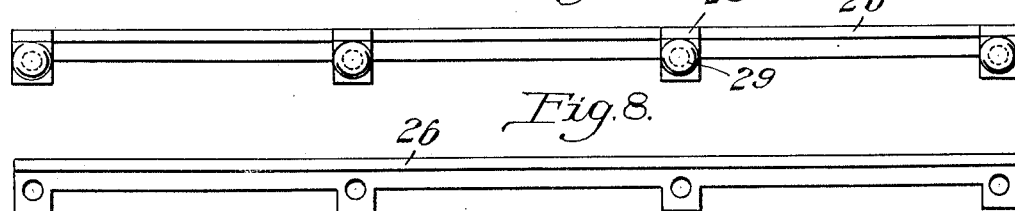
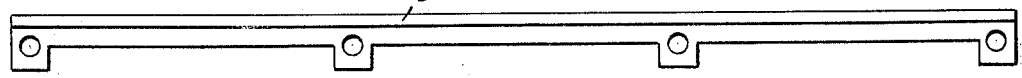
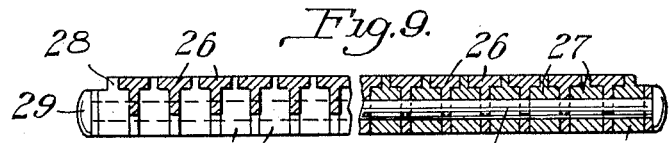
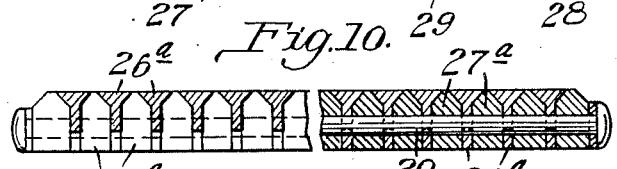
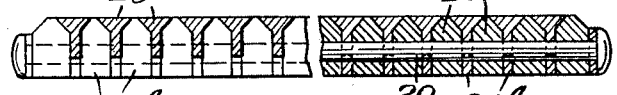
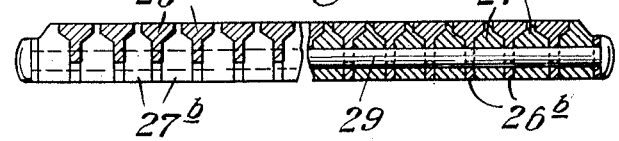
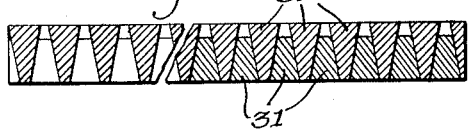
INVENTOR
Samuel Blaine Stine,
By Archworth Martin,
Attorney Patented Aug. 6, 1929.

1,723,311

UNITED STATES PATENT OFFICE.

SAMUEL BLAINE STINE, OF OSCEOLA MILLS, PENNSYLVANIA.

METHOD OF MAKING SCREEN PLATES.

Application filed April 19, 1928. Serial No. 271,241.

My invention relates to screen structures, and more particularly to those composed of bars which are spaced apart to provide the necessary slots and which are assembled to form a unitary structure.

My invention has for its object the provision of a simplified method for making screen structures of generally improved forms.

Some of the forms which my invention may take are shown in the accompanying drawing, wherein Figure 1 is a plan view of a partially-constructed screen; Fig. 2 is a view taken on the line II—II of Fig. 1, and showing the manner in which the screen parts are temporarily held in assembled relation; Fig. 3 is a plan view showing one stage in the operation of constructing the screen; Fig. 4 is a view similar to Fig. 2, but showing a modified form of screen bar and spacing elements therefor; Fig. 5 is a view showing one manner in which the screen bars and the spacing blocks of Fig. 4 may be permanently held in assembled relation; Fig. 6 is a plan view of a structure similar to that of Fig. 5, but showing screen bars and spacing blocks of different form; Fig. 7 is a side elevational view of the structure of Fig. 6; Fig. 8 is a side elevational view of one of the screen bars of Fig. 6;
Fig. 9 is a view taken on the line IX—IX of Fig. 6; and Figs. 10 and 11 show modifications of the structure of Fig. 9, and Fig. 12 shows still another modification of the invention.

Referring to Figs. 1 to 3, I show screen bars 14 disposed in a common plane and spaced apart by spacing blocks 15 which determine the width of the slots between the bars. When the bars 14 and the blocks 15 have been assembled as shown in Fig. 1, they are temporarily held in assembled relation by clamping blocks 16 and a tie bar or clamping rod 17 that is threaded at its ends for the reception of nuts 18 that are turned to move the blocks 16 into clamping engagement with the screen bars and the spacing blocks, a filler block 19 being provided at the outer sides of the outermost screen bars.

When the screen bars and the spacing blocks are assembled as shown in Fig. 2, they will be marked with boundary lines which will constitute an outline of the bars or solid portions of a base or skeleton framework 21 which is indicated by dotted lines in Fig. 3 as being of generally segmental form, and constituting a portion of an annular screen structure, such as employed in connection with the pans of shale-crushing mills. Thereupon, the screen bars are welded together at points above the solid portions of the base 21, as indicated at 22. The welding may be done electrically or otherwise, to form a unitary screen plate. Short strips or blocks 22$^a$ are then welded between the bars 14 to stiffen the screen plate. The clamps 16 and the spacing blocks 15 are then removed, whereupon holes are drilled through the screen plate and it is riveted to the base frame 21, as at 23, the screen plate being trimmed to conform in width and length to the frame, as shown in the lower portion of Fig. 3. The screen plate will then be substantially integral or solid in those portions which overlie the solid portions of the frame and slotted at points between such solid portions and the spacing blocks 22$^a$. A screen plate so formed has greater screening area than is ordinarily found in plates formed simply by slitting a sheet of steel.

In Fig. 2, the sides of adjacent bars are shown as disposed in parallelism for a short distance vertically and then diverging. This arrangement permits of considerable wearing-away at the tops of the screen bars before the slots become unduly wide. At the same time, the tapering effect reduces tendency to clog and the screen bars have sufficient thickness to enable them to withstand considerable pressures. The blocks 15 are so shaped as to snugly engage the sides of the screen bars when such bars are assembled, and the width of the blocks 15 determines the width of the slots between the screen bars.

In Fig. 4, the screen bars 14$^a$ and consequently the spacing blocks 15$^a$ are shown as of different cross-sectional form than the bars and blocks of Fig. 2, for the purpose of providing screen slots whose walls diverge throughout their entire depth, the bars and the spacing blocks being of generally wedge shape in cross section.

In Fig. 5, I show the bars 14$^a$ and the spacing blocks 15$^a$ as being held in assembled relation by a tie bolt 24 instead of by the clamping members of Fig. 2. This form of screen structure may be considered as complete in itself, since the tie bolts may hold the bars and their spacing blocks in permanently assembled relation and the bars need not be welded to a base frame as in Fig. 1. It will, of course, be understood that tie rods 24 may be employed for holding the screen bars and the spacing blocks of Fig. 2 in assembled relation, if desired, by providing holes through such bars and blocks.

Referring to Figs. 6 to 9, I show screen bars 26 that are of T form in cross section. Spacing blocks 27 are interposed between the screen bars at intervals, as shown more clearly in Fig. 6, and filler or clamping blocks 28 are provided at the outer sides of the outermost screen bars. The blocks and the screen bars are perforated for the reception of tie bolts 29, as in the case of the structure of Fig. 5. The structure of Fig. 6 may be welded, riveted, or otherwise secured to a supporting frame, if desired.

Fig. 10 shows screen bars 26ª and spacing blocks 27ª of somewhat different form than the corresponding members of Figs. 6 and 9, while the bars 26ᵇ and the blocks 27ᵇ of Fig. 11 are slightly different from the bars 26ª and the blocks 27ª of Fig. 10.

From the foregoing, it will be seen that screens of various forms may be readily constructed in the practice of my invention. For instance, the screen bars may be of various widths and thicknesses, and any desired spacing therebetween may be readily secured merely by employing spacing blocks of suitable width.

As shown in Fig. 12, the upper ends of the spacing blocks 31 do not extend to a point flush with the top surfaces of the screen bars 32, but terminate at a point below such top surfaces. This arrangement is particularly suitable where the blocks are permitted to remain permanently in place between the bars and where the screen is employed for de-watering coal, so that channels will exist between the bars at points above the blocks.

I claim as my invention:—

1. The method of making screen plates which comprises assembling screen bars in spaced relation, securing said bars into a unitary structure along lines coincident with the bars of a supporting base, and trimming the plate so formed to conform to the outline of said base.

2. The method of making screen plates which comprises assembling screen bars in spaced relation, welding said bars into a unitary structure along lines coincident with the bars of a supporting base, and trimming the plate so formed to conform to the outline of said base.

3. The method of making screen plates which comprises assembling screen bars in spaced relation, securing said bars into a unitary structure along lines coincident with the bars of a supporting base, welding stiffening blocks in position between said bars at points intermediate the said lines, and trimming the plate so formed to conform to the outline of said base.

4. The method of making screen plates which comprises assembling screen bars with spacing blocks interposed between the same, securing said bars into a unitary structure along lines coincident with the bars of a supporting base, and trimming the plate so formed to conform to the outline of said base.

In testimony whereof I, the said SAMUEL BLAINE STINE, have hereunto set my hand.

SAMUEL BLAINE STINE.